US006921213B2

(12) United States Patent
Rosenberg et al.

(10) Patent No.: US 6,921,213 B2
(45) Date of Patent: Jul. 26, 2005

(54) ADAPTABLE OPTICAL SUBASSEMBLY MODULE FOR DIFFERENT OPTICAL FIBER CONNECTION INTERFACES

(75) Inventors: Paul Rosenberg, Sunnyvale, CA (US); Martin Wisecarver, Fremont, CA (US); Ramesh Sundaram, Fremont, CA (US); Dean Haritos, Saratoga, CA (US); Todd L. Gustavson, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/426,204

(22) Filed: Apr. 29, 2003

(65) Prior Publication Data

US 2004/0086239 A1 May 6, 2004

Related U.S. Application Data

(60) Provisional application No. 60/423,036, filed on Nov. 1, 2002.

(51) Int. Cl.[7] .................................................. G02B 6/42

(52) U.S. Cl. ............................ 385/88; 385/93; 385/14; 359/152

(58) Field of Search ............................ 385/88, 93, 14; 359/152

(56) References Cited

U.S. PATENT DOCUMENTS

| | | | |
|---|---|---|---|
| 4,179,801 A | | 12/1979 | Hollis |
| 5,274,729 A | | 12/1993 | King et al. |
| 5,333,221 A | | 7/1994 | Briggs et al. |
| 5,594,826 A | | 1/1997 | Wood et al. |
| 5,717,801 A | | 2/1998 | Smiley |
| 6,130,983 A | | 10/2000 | Cheng |
| 6,347,888 B1 | | 2/2002 | Puetz |
| 6,367,984 B1 | | 4/2002 | Stephenson et al. |
| 6,464,406 B1 | | 10/2002 | Yarita et al. |
| 6,497,518 B1 | * | 12/2002 | Deane ......................... 385/92 |
| 2003/0057363 A1 | * | 3/2003 | Anderson et al. |
| 2003/0198445 A1 | * | 10/2003 | Inujima et al. |

* cited by examiner

*Primary Examiner*—John R. Lee
*Assistant Examiner*—Zia R. Hashmi
(74) *Attorney, Agent, or Firm*—Workman Nydegger

(57) ABSTRACT

A modular TOSA that is compatible with multiple optical fiber connector standards and a method of making the TOSA are presented. With the invention, a modular TOSA can be made compatible with different connector standards by switching the nose assembly while keeping the port assembly design and the adapter assembly design constant. The nose assembly that is compatible with the desired connector standard is selected from a group of nose assemblies, which are designed to be coupled with the same port assembly but having different connector standards.

10 Claims, 1 Drawing Sheet

12b 16 20 26 24 28 18 26 32 24 26 28 12a 22 10 14 30

20
16
10
18
22
12b
26
28
26
26
28
12a
24
24
14
32
30

ADAPTABLE OPTICAL SUBASSEMBLY MODULE FOR DIFFERENT OPTICAL FIBER CONNECTION INTERFACES

RELATED APPLICATION

The present application claims priority under 35 U.S.C. § 119(e) from U.S. Provisional Application No. 60/423,036 filed on Nov. 1, 2002.

FIELD OF THE INVENTION

The present invention relates to optical transmitters, and more particularly to transmitter optical subassembly modules.

BACKGROUND OF THE INVENTION

Transmitter optical subassemblies (TOSA's) may be assembled using a modular design. In one such approach, three primary subassemblies are employed: a port assembly, a nose assembly and an adapter assembly. The port assembly includes a laser diode device and supporting optics. The nose assembly includes mechanical elements for connecting with an optical fiber. The adapter assembly is used to attach the TOSA to a higher level assembly, such as an optical transceiver or transponder. TOSA's are primarily used in electro-optical converter devices for data communications and telecommunication applications.

The nose assembly is typically connected to the port assembly and the adapter assembly, so that the TOSA is secured in place and can receive the connector of an optical fiber. The alignment between the port assembly and the nose assembly must be precise so that light generated by the laser diode is efficiently coupled into an optical fiber connected to the TOSA. This is typically done by connecting an optical fiber to a nose assembly, positioning the nose assembly to the port assembly to maximize the amount of light coupled into the optical fiber, and then permanently affixing the port and nose assemblies together (e.g. welding, adhesives, solders, fasteners, etc.).

One problem with present TOSA manufacturing is that there are many different mechanical connector standard interfaces for optical fiber connectors (e.g. SC, ST, LC, FC, etc). Each such connector standard requires a different mechanical design of the nose assembly (e.g. different size/shape receptacles for receiving different sized/shaped ferrule connectors). Since port assemblies are also typically designed specially for the nose assembly to which it will attach, different port assembly designs are also necessary for the various connector standards. Thus, any given TOSA design is compatible with only one of the connector standards. In order to manufacture TOSA's compatible with the various connector standards, a unique TOSA design (having unique port, nose and adapter assembly designs compatible with one of the connector standards) must be separately made and stocked for each connector standard, which adds to manufacturing and inventory costs because each design version of the TOSA subassemblies must be designed, fabricated and stocked.

SUMMARY OF THE INVENTION

The present invention solves the aforementioned problems by providing a modular TOSA that is compatible with multiple optical fiber connector standards and a method of building such a TOSA. The TOSA module includes a port assembly and an adapter assembly that are coupled with a nose assembly, wherein the nose assembly is selected from a group of nose assemblies that are compatible with different optical fiber connector interfaces. The nose assemblies, although compatible with different connector interfaces, can be used with the same port assembly. Thus, the TOSA module can be built by selecting a nose assembly that is designed for a desired connector standard and coupling the selected nose assembly to the port assembly. With the invention, the optical fiber connector compatibility of a TOSA module can be changed by simply switching the nose assembly while keeping the same adapter assembly and port assembly.

DETAILED DESCRIPTION OF THE PREFERRED EMBODIMENTS

Figure 1:
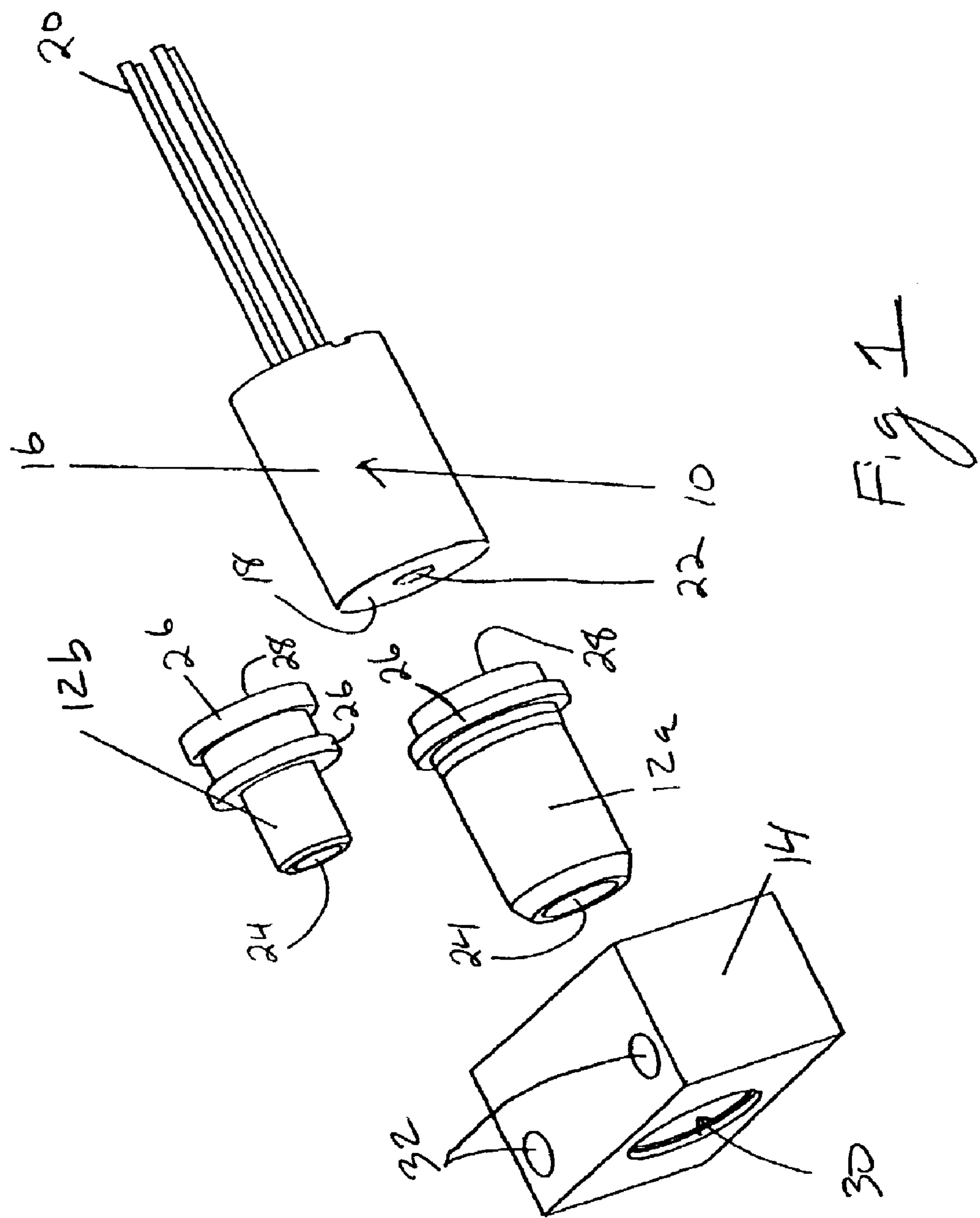
FIG. 1 is an exploded view of a TOSA assembly showing two different possible nose assembly designs with the same port and adapter assembly designs.

The present invention is a modular transmitter optical subassembly (TOSA) that utilizes the same port and adapter assembly designs, and only varies the design of the nose assembly for compatibility with various optical fiber connector standards. The TOSA of the present invention is shown in FIG. 1, and includes a port assembly 10, one of a plurality of nose assemblies 12*a*, 12*b*, etc., and an adapter assembly 14. For simplicity of illustration, it is assumed that the port assembly has been fabricated with the optical beam focused at a position such that good coupling is achieved when the nose assembly is aligned to the port.

The port assembly 10 includes a cylindrical housing 16 that terminates in a mounting surface 18. A laser diode (not shown) is disposed in the housing 16, with electrical leads 20 extending from the housing. Optical elements (not shown) in the housing 12 focus the light beam generated by the laser diode out through an output port 22 in the mounting surface 18.

A plurality of possible nose assemblies (12*a*, 12*b*, etc.) are available for attachment to the port assembly 10, where the designs of the nose assemblies vary depending on the types of optical fiber connectors that will be used to connect therewith. For example, the nose assemblies 12*a*/12*b* shown in FIG. 1 each include a hollow ferrule receptacle 24 for receiving a cylindrical shaped ferrule. The length and diameter of the ferrule receptacles 24, as well as the number of engagement flanges 26, for these nose assemblies are different. Nose assembly 12*a* is compatible for engagement with an SC optical connector, while nose assembly 12*b* is compatible for engagement with an LC optical connector. All the nose assemblies (12*a*, 12*b*, etc.) have a mounting surface 28 for engagement with port assembly mounting surface 18.

Generally, adapter assemblies may be configured in a variety of geometries to allow the nose assembly and/or the port assembly to properly fit into any higher level assembly. Adapter geometry and material may also be optimized to enhance EMI/EMC performance or thermal performance, or to facilitate automatic assembly. In order to reduce the thermal resistance from laser chip to transceiver case, thermal interface materials such as epoxies, solders, polymer pads, etc. may be used to improve physical contact between the nose and/or the port assembly and the adapter. Adhesives may also be used simply to improve the quality of attachment between the nose and/or port assembly and the adapter.

The adapter assembly 14 includes a central port 30 for receiving any of the nose assemblies and for engaging with the engagement flanges 26 thereon. Mounting holes 32 are formed through the adapter assembly 14 for receiving mounting screws that attach the adapter assembly 14 (and the nose/port assemblies attached thereto) to a higher level assembly (e.g. transmitter assembly). A person of ordinary skill in the art will understand that the adapter assembly 14 could have various different forms depending on the fiber type, and does not have to be an integrated universal adapter. For example, the adapter assembly 14 could include an adapter block for SC and a portion of the TOSA shell that includes the functionality for LC.

To fabricate a TOSA for any particular connector standard, the proper nose assembly (compatible with the particular connector standard) is selected. An optical fiber is inserted into the nose assembly. The nose assembly mating surface 28 is positioned against the mating surface 18 of a port assembly 10. With the laser diode activated, the port and nose assemblies are positioned relative to each other to maximize the amount of light from the laser diode that is coupled into the optical fiber. The port and nose assemblies are then affixed to each via welding, adhesives, solders, or fasteners, etc. The nose assembly is then inserted through the central port 30 of the adaptor assembly, and held in place via flange(s) 26, welding, adhesives, friction fit, etc. Epoxy may be used.

With the present invention, a single port assembly design and a single adapter assembly design are made to accept and be compatible with a plurality of different nose assembly designs, for fabricating TOSA's for various optical connector standards. This allows for a simpler, more focused manufacturing process. Fewer types of manufacturing equipment and fewer piece part variations are needed, resulting in higher production yields, greater through-put and lower cost. The port assembly 10 is typically the most complex and expensive portion of the TOSA, requiring the longest time to develop and bring into production. Use of a common port assembly for all optical connector standards allows for quicker development of new products given that a single proven component can be used. The use of a proven component also lowers the risk associated with any development product.

What is claimed is:

1. A method of building a transmitter optical subassembly (TOSA) module, the method comprising:

selecting a nose assembly from a group of nose assemblies, the group including nose assemblies that are each configured to interface with a different connector interface; and attaching the selected nose assembly to a specific port assembly, wherein the specific port assembly is compatible with each of the nose assemblies in the group.

2. The method of claim 1 further comprising attaching an optical fiber to the nose assembly.

3. The method of claim 1, wherein attaching the selected nose assembly comprises welding, using an adhesive, soldering, or mechanically fastening the nose assembly to the specific port assembly.

4. The method of claim 1 further comprising inserting the nose assembly through a central part of an adaptor assembly and fixing the nose assembly in place via one of welding, using an adhesive, and friction fitting.

5. A transmitter optical subassembly (TOSA) module comprising a port assembly and an adapter assembly coupled with a nose assembly, wherein the nose assembly is selected from a group of nose assemblies, each of the nose assemblies in the group having an end that is compatible with a unique optical fiber connector interface, and wherein each of the nose assemblies in the group are compatible with the port assembly and the adapter assembly.

6. The TOSA module of claim 5 wherein the nose assemblies have ferrule receptacles of different lengths and diameters.

7. The TOSA module of claim 5 wherein the nose assemblies have different number of flanges, the flanges designed to engage with the adapter assembly.

8. The TOSA module of claim 5 wherein the adapter assembly comprises a central port for receiving one of the group of nose assemblies.

9. The TOSA module of claim 5 wherein the optical fiber connector interface is selected from a group consisting of SC, ST, LC, and FC standard interfaces.

10. A method of changing the optical fiber connector compatibility of a transmitter optical subassembly (TOSA) module that includes an adapter assembly, a nose assembly, and a port assembly, the method comprising changing the nose assembly while keeping the same adapter assembly and port assembly.

* * * * *

UNITED STATES PATENT AND TRADEMARK OFFICE

CERTIFICATE OF CORRECTION

PATENT NO. : 6,921,213 B2
APPLICATION NO. : 10/426204
DATED : July 26, 2005
INVENTOR(S) : Rosenberg et al.

It is certified that error appears in the above-identified patent and that said Letters Patent is hereby corrected as shown below:

Cover Page
Item [56], insert:

| -- | FOREIGN PATENT DOCUMENTS | | |
|---|---|---|---|
| | EP | EP 1 041 413 | 10/2000 |
| | EP | EP 1 253 451 | 10/2002 -- |

Column 1
Line 52, change "TOSA'a" to --TOSAs--

Column 3
Line 29, change "TOSA's" to --TOSAs--

Column 4
Line 15, change "part" to --port--

Signed and Sealed this

Fourteenth Day of August, 2007

JON W. DUDAS
*Director of the United States Patent and Trademark Office*